United States Patent [19]

Ovard

[11] Patent Number: 4,530,707
[45] Date of Patent: Jul. 23, 1985

[54] APPARATUS FOR REMOVING DROPLETS ENTRAINED IN A GAS STREAM

[76] Inventor: John C. Ovard, 3465 Ridgeview Dr., Santa Rosa, Calif. 95404

[21] Appl. No.: 494,362

[22] Filed: May 13, 1983

Related U.S. Application Data

[63] Continuation of Ser. No. 962,982, Nov. 22, 1978, abandoned.

[51] Int. Cl.³ .............................................. B01D 45/06
[52] U.S. Cl. ................................. 55/440; 55/257 PV
[58] Field of Search ............ 55/257 PV, 257 QV, 440

[56] References Cited

U.S. PATENT DOCUMENTS

| | | | |
|---|---|---|---|
| 1,926,924 | 9/1933 | Sylvan | 55/440 |
| 2,356,192 | 8/1944 | Yingling | 55/440 |
| 2,532,332 | 12/1950 | Rowand | 55/440 |
| 2,583,171 | 1/1952 | Green et al. | 55/440 |
| 2,674,849 | 4/1954 | Bowden | 60/39.60 |
| 2,892,509 | 6/1959 | Baker et al. | 55/440 |
| 2,911,011 | 11/1959 | Niehart | 55/440 |
| 3,065,587 | 11/1962 | Fordyce et al. | 55/442 |
| 3,276,193 | 10/1966 | Lamb | 55/440 |
| 3,731,461 | 5/1973 | Hamon | 55/222 |
| 3,748,832 | 7/1973 | Furlong et al. | 55/440 |
| 3,778,983 | 12/1973 | Rygg | 55/440 |
| 3,813,855 | 6/1974 | Hill et al. | 55/440 |
| 3,876,396 | 4/1975 | Arnold et al. | 55/257 PV |
| 3,912,471 | 10/1975 | Cotton, Jr. | 55/440 |
| 3,933,450 | 1/1976 | Percevaut | 55/257 QV |
| 3,982,914 | 9/1976 | Crimble | 55/257 QV |
| 4,014,669 | 3/1977 | Thompson et al. | 55/440 |

FOREIGN PATENT DOCUMENTS

| | | | |
|---|---|---|---|
| 1901014 | 11/1970 | Fed. Rep. of Germany | 55/440 |
| 17127 | of 1909 | United Kingdom . | |
| 13297 | of 1910 | United Kingdom | 55/440 |

OTHER PUBLICATIONS

J. K. Chan et al., Design Studies of Current Design and Improved Cooling Tower Drift Eliminators, Symposium on Environmental Effects of Cooling Towers Emissions, University of Maryland, May 1978, Proceedings III, pp. 127-149.

H. Chilton, Elimination of Carryover from Packed Towers with Special Reference to Natural Draught Water Cooling Towers, Trans. Instn. Chem. Engrs., vol. 30, 1952, pp. 235-250.

*Primary Examiner*—David L. Lacey
*Attorney, Agent, or Firm*—Limbach, Limbach & Sutton

[57] ABSTRACT

An apparatus for removing droplets entrained in a gas stream is disclosed wherein a plurality of longitudinally extending eliminator blades are positioned in side by side spaced apart relation for passing a gas stream with each blade having an inlet inclined section and an outlet inclined section of opposite slope connected by an intermediate transition section establishing a convex surface on the bottom of the blade and a concave surface on the top of the blade. The convex surface of the blade has a deviation greater than the deviation of the concave surface. The outlet section has a trailing end differing in shape from the leading end of the inlet section and is shown as an airfoil section at the trailing end of the concave surface of the blade. The blades are provided with notches at their ends corresponding with notches in end supporting plates for mechanically interlocking each blade with the end plates.

5 Claims, 5 Drawing Figures

APPARATUS FOR REMOVING DROPLETS ENTRAINED IN A GAS STREAM

This application is a continuation of my application Ser. No. 962,982, filed Nov. 22, 1978, now abandoned.

BACKGROUND OF THE INVENTION

The present invention relates to a method and apparatus for removing droplets of liquid entrained in a gas stream.

There are a number of industrial processes wherein a liquid and a gas come into direct contact with each other as a part of the process. As a result of viscous and aerodynamic forces, liquid droplets of various sizes are entrained and carried along with the moving gas stream. In most instances it is desirable or even mandatory that these droplets be removed from the gas stream for economic or environmental reasons. This invention provides a highly efficient means for collecting droplet mists in a gas stream over a wide range of droplet sizes and gas velocities, and the droplet removal task is accomplished with low energy consumption. This device, commonly referred to as a mist eliminator or drift eliminator, is adaptable to direct contact processes employing either counterflow or crossflow liquid and gas flow relationships and is particularily suitable for removing water droplets from an air stream as required in cooling towers of either the counterflow or crossflow type.

Mist eliminators known heretofore have certain performance and application limitations which are overcome in the present invention. There are five primary considerations in the design and application of mist elimination devices. First and foremost is the requirement of a high collection efficiency in the removal of liquid droplets. Without a high collection efficiency over the full liquid droplet size range encountered, the device has limited application. Most known mist eliminators have high droplet collection efficiencies for droplet sizes of 100 microns or greater in the gas velocity range of current application practice. However, in droplet sizes below 100 microns droplet collection efficiencies fall off rapidly. In many processes the majority of entrained droplets are found in the smaller size ranges. When high collection efficiencies for smaller droplet size ranges are required with known mist eliminators it becomes necessary to take additional steps or to restrict operating limits to remove these smaller droplets. Common means for doing this in current practice are to add secondary droplet removal devices, to limit gas flow velocities, to increase the density of mist removal components, to utilize mist eliminator designs with higher energy consumption or some combination of the above. The mist eliminator of the present invention has a substantially higher droplet collection efficiency particularly in the smaller droplet sizes over a wider range of gas velocities than heretofore known thereby eliminating the need for employing a secondary removal means or limiting operational parameters either of which result in higher equipment first cost and higher energy consumption.

The second consideration in mist eliminator design is to minimize the resistance to gas flow through the device. A high gas flow resistance per unit area will result in high energy consumption and will normally require larger gas moving equipment or an increase in the size of the process equipment itself. The present invention has air resistance characteristics similar to known low energy loss mist eliminators but achieves higher collection efficiencies and stable operation over a wider range of velocities than known mist eliminators.

A third design consideration is to assure that liquid collected on mist eliminator surfaces will not be torn from these surfaces at critical points by viscous and aerodynamic forces imposed by gas flow through the device thereby causing carry over and liquid re-entrainment which negates the purpose and effectiveness of the mist eliminator. This phenomenon is primarily a function of mist eliminator design characteristics and gas flow rate. The gas velocity at which carry over and re-entrainment become a significant problem may be described as the breakdown velocity. The present invention has a breakdown velocity from 20 to 80 percent higher than known mist eliminator designs thereby allowing higher gas flow rates through the mist eliminator while maintaining high droplet collection efficiencies and assuring stable operation.

The fourth design consideration is in providing an adequate means for draining collected liquid from the mist eliminator such that liquid does not build up on the mist eliminator surfaces thereby restricting gas flow or creating a carry over problem as previously described. In mist eliminators employing meshes or screens or those that use a bed filled with beads or rings, etc., this can be a major design limitation. In blade type designs such as the present invention, drainage is not usually a major concern. Collected liquid will naturally adhere to the blade surface and will drain as large drops or streams ultimately flowing by gravity to the liquid means of the process apparatus. Liquid flow may be directed to a specific point which is shielded from the main gas flow stream by inclining blades or the entire mist eliminator assembly at an angle relative to a horizontal plane. This is easily accomplished with the present invention in assembly or installation.

The final design consideration relates to structural integrety, dimensional stability and ease of assembly and installation. The mist eliminator design of the present invention incorporates a simple and unique mechanical interlocking means for connecting blades and end plates which allows mist eliminators to be assembled into panels. It also assures dimensional accuracy and consistency during and after assembly and provides a positive blade end seal in panel assemblies.

Illustrations of the principal prior mist eliminator designs and a newly proposed design are presented in a very recent article entitled "Design Studies of Current Design and Improved Cooling Tower Drift Eliminators" by Joseph K. Chan and Michael W. Golay, presented at the Symposium on Environmental Effects of Cooling Tower Emissions, at University of Maryland, May, 1978, Proceedings III pages 127-149. That article illustrates the (a) sinus-shaped, (b) HI-V, (c) zig-zag, (d) single-layer louver, (e) double-layer louver, and (f) asbestos-cement drift eliminator geometries in FIG. 1 and a recent airfoil drift eliminator geometry in FIG. 15. The specific construction of a geometry referred to as the "HI-V" geometry is illustrated in U.S. Pat. No. 3,748,832 to D. B. Furlong and J. C. Ovard which is assigned to Fluor Cooling Products Company.

SUMMARY OF INVENTION

It is the primary object of the present invention to provide a mist eliminator having improved liquid droplet collection efficiencies over the full range of droplet sizes encountered in direct contact liquid and gas process and heat exchange equipment while maintaining a low resistance to gas flow through the mist eliminator.

Another object is to provide a mist eliminator for liquid and gas direct contact apparatus which will effectively remove liquid droplets at higher gas velocities than heretofore known thereby permitting economies in the size and cost of the process or heat exchange apparatus while assuring efficient and stable mist removal.

A further object of the invention is to provide a mist eliminator which may be preassembled into panels thereby obtaining a compact mist eliminator unit which maintains dimensional accuracy, is easy to assemble and adaptable to a wide variety of liquid and gas direct contact apparatus of either the counterflow or crossflow type.

Another object of the present invention is to provide a mist eliminator that can be easily and economically manufactured from a variety of materials while possessing sufficient structural strength, dimensional stability, durability and corrosion resistance for the intended application.

Yet another object is to provide a mist eliminator design with positive sealing means such that voids and discontinuities are eliminated thereby preventing bypass of entrained droplets.

Broadly stated, the present invention, to be described in greater detail below, is directed to a mist eliminator which incorporates the objects and advantages set forth above and comprises a plurality of longitudinally extending blades positioned in side by side spaced apart relation for passing a gas stream through the space between adjacent blades from an inlet to an outlet with each blade having an inlet inclined section and an outlet inclined section of opposite slope connected by an intermediate transition section which establish a basically convex surface on the bottom of the blade and a concave surface on the top of the blade and with the outlet inclined section of the concave surface being longer than the inlet inclined section of the convex surface.

In a preferred embodiment of the present invention the outlet section is provided with a trailing end differing in shape from the leading end of the inlet section. A particular preferred embodiment includes an airfoil section embodied in the outlet concave top surface for establishing a stagnation region upstream thereof.

In the preferred embodiment of the present invention the blade is thicker in the transition region than in the inlet and outlet inclined sections such that the convex surface of the blade has a deviation greater than the deviation of the concave surface.

The objects for the manufacture of a mist eliminator with positive sealing means are accomplished by notches extending longitudinally into each end of the blade and which mate with coresponding notches in a pair of flanged, supporting end panels and with a notched out portion in the airfoil section at each end of each blade for engaging a projecting rib on the side panel.

Expressed in another way the invention is directed to the apparatus for and the method of first turning the gas stream at one side toward the other side and accelerating the stream for collection of large droplets at the one side, then turning the gas stream back toward the one side and accelerating the stream and establishing a stagnation region at the other side down stream of the second turn for collecting small droplets at that other side of the stream.

The mist eliminator of the present invention removes liquid droplets from a gas stream having a significantly higher small droplet collection efficiency than known mist eliminators with comparable low gas flow resistance characteristics as commonly employed in direct contact liquid and gas industrial process or heat exchange apparatus. Gas entrained liquid droplets impinge on mist eliminator blades where they are collected and subsequently drained to the liquid collecting means of the apparatus. The blades have an aerodynamically efficient shape to minimize resistance to gas flow and are designed to minimize carry over and to extend the useful gas flow operating range of the mist eliminator. It can be easily manufactured as either a single wall or a double wall blade from a variety of plastic, metal or other materials. Other features and objects of the invention will become apparent to those skilled in the art as the invention is disclosed.

DESCRIPTION OF PREFERRED EMBODIMENT

Figure 1:
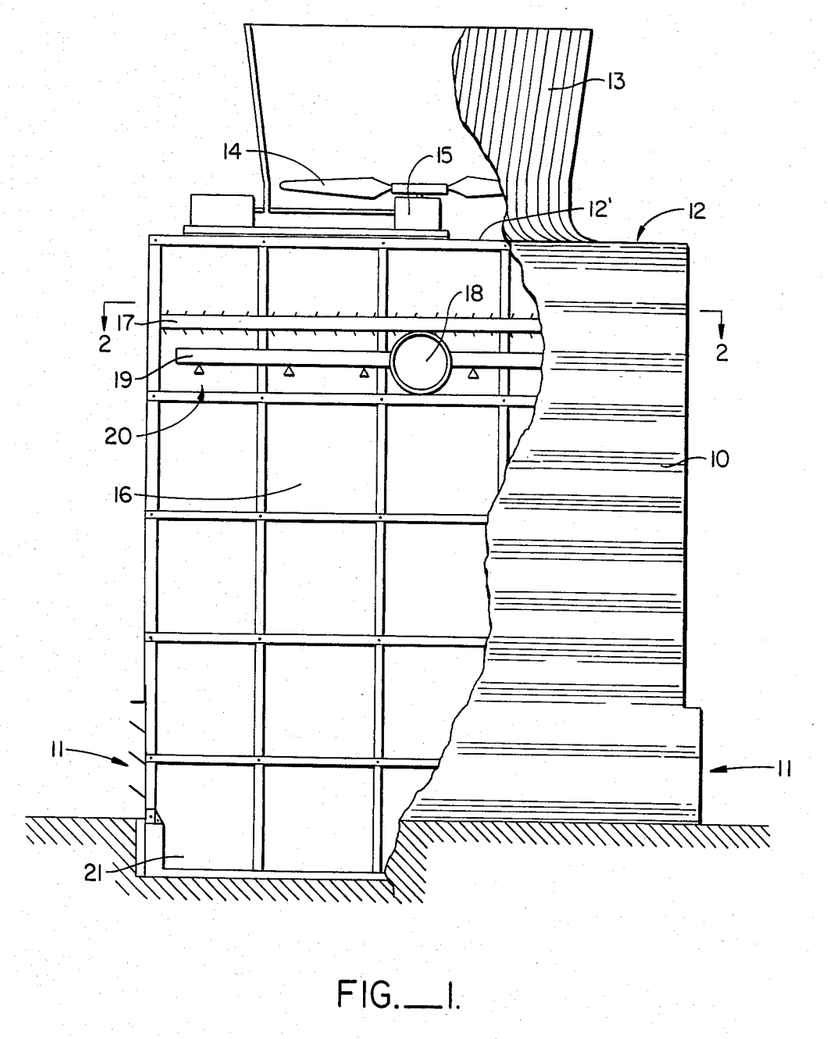
FIG. 1 is a schematic elevational view, partially broken away, illustrating a counterflow cooling tower incorporating the present invention.

A counterflow cooling tower as shown in FIG. 1 represents a typical application of mist eliminators to a direct contact heat exchanger. Those skilled in the art will recognize that the present invention is equally adapatable to crossflow cooling towers, gas scrubbers and other industrial processes where a moving gas carries entrained liquid droplets which must be removed from the gas stream.

Referring to FIG. 1, a mechanical draft counterflow cooling tower consisting of a housing 10 with air inlets 11 at the bottom on two opposing sides and top deck 12 with an opening 12' therein connected to a fan shroud 13. A fan 14 in the throat of the shroud 13 is rotated by a fan drive system 15 and draws air through the cooling tower housing 10. Air is drawn through the air inlets 11, turns and flows vertically upward through a direct contact heat exchange section 16, through the mist eliminator section 17 and upward through the fan 14 after which it is discharged to the atmosphere at the exit of the fan shroud 13 in a heated condition. Concurrently, heated water is pumped through a water distribution system to the top of the tower where it enters a header 18 and flows to lateral pipes 19 and is sprayed uniformily over the entire plan area within the housing 10 by a plurality of spray nozzles 20 in direct communication with the lateral pipes 19. Liquid thus distributed falls by gravity counter-current to the direction of air flow through the heat exchanger section 16 until it reaches the water collecting basin 21 in the cooled condition. In the heat exchanger section the water comes in contact with a fill material whose primary purpose is to create the most intimate mixing of water and air practical to promote water cooling by a combination of evaporation and sensible heat transfer. The fill material disperses the water by a combination of splash promoting means and the formation of thin liquid films on the surfaces of the fill material and structure. The smaller droplets created by this process and those generated immediately above by the spray nozzles 20 become entrained and are carried upward with the main flow of air as a result of their light weight and the relatively higher viscous and aerodynamic forces imposed on them by the upwardly moving air. In the absence of a mist eliminator section 17 these droplets would be discharged to the atmosphere along with the main body of heated air. As the air velocity dissipates in the atmosphere these droplets will fall like rain in the surrounding area. This creates a hazard to electrical equipment and can also create corrosion problems on equipment in the immediate vicinity of the tower. In instances where sea or brackish water is circulated through the system these problems can be severe and additional irreparable damage to plant life may also occur due to the salt content.

Figures 2, 3:
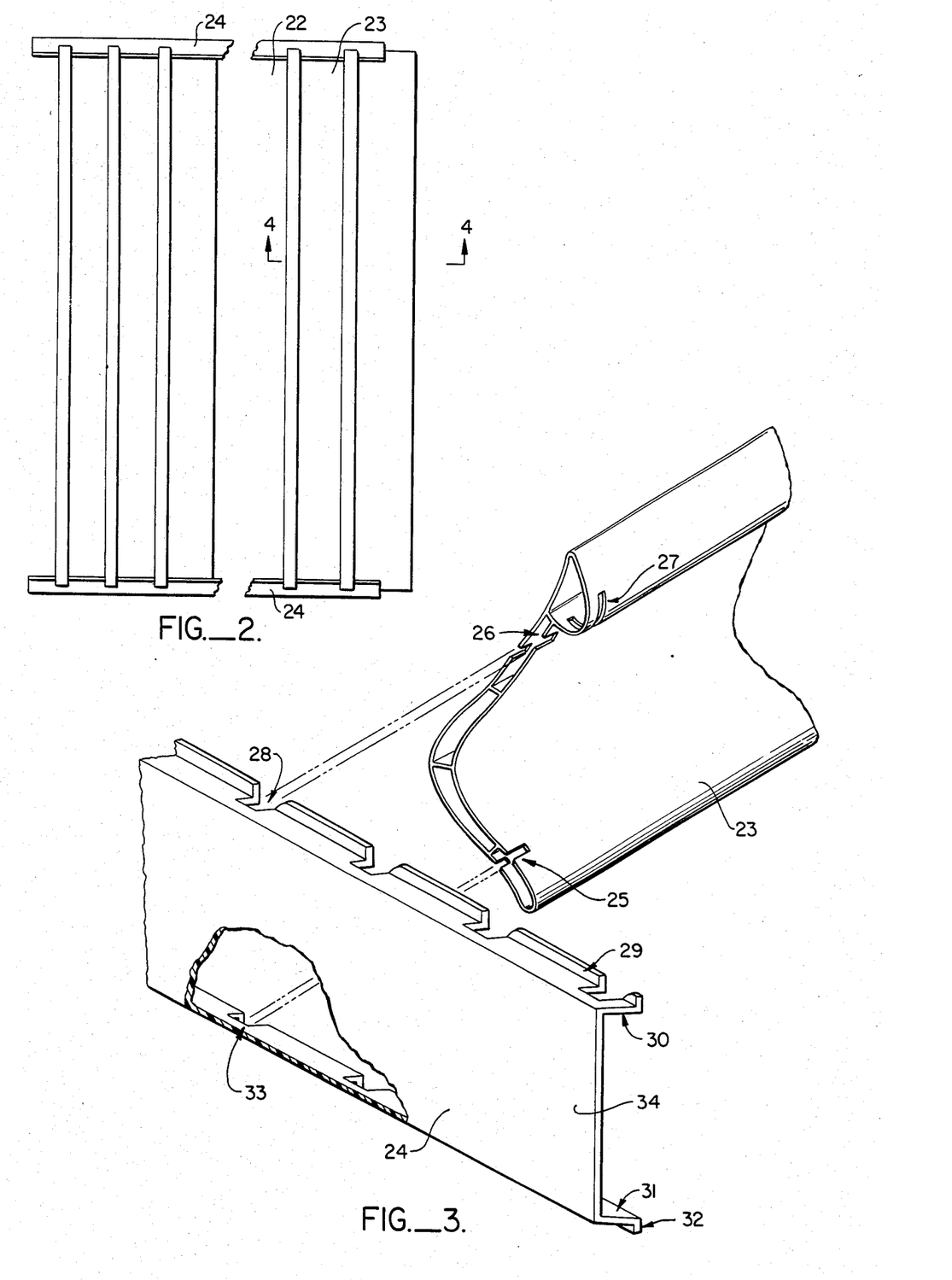
FIG. 2 is a plan view of a portion of the structure shown in FIG. 1 taken along line 2—2 in the direction of the arrows illustrating the outlet configuration of the mist eliminator of the present invention.
FIG. 3 is a schematic prospective view, partially exploded and partially broken away, illustrating the interlocking feature of the blades and end panels making up the drift eliminator.

The mist eliminator section 17 of the present invention consists of a plurality of preassembled mist eliminator panels 22 which can best be seen in FIG. 2. Mist eliminator panels 22 consist of a plurality of blades 23 of unique profile which are connected to end plates 24 by a mechanical interlocking means as hereinafter described. Entrained droplets impinge on blade surfaces where they combine into larger droplets or liquid films which ultimately fall by gravity to the water collecting means 21 of the tower.

The mist eliminator panels 22 are assembled by means of mechanical interlocking notches in the blades 23 and flanged end plates 24 respectively. Once assembled the mechanical interlocking means prevents blade rotation and movement in any direction. It also provides a positive means of establishing and fixing the space and position relationships between adjacent blades and blades and end plates. Movement of blades and end plates is totally restricted and disengagement of blades and end plates is prevented once assembly is completed. Assembly does not require fasteners or bonding agents and can be accomplished quickly and easily without the use of special tools or equipment. Further, this interlocking method does not depend on the resilience or flexibility of the blade or end plate material for its application. In addition, end plate structural strength and dimensional stability are not compromised by a plurality of slots of large dimension relative to the overall width of either the end plate web or flange elements.

The unique mechanical interlocking assembly method of the present invention can best be described by referring to FIG. 3.

As illustrated in FIG. 3 each mist eliminator blade 23 includes a pair of longitudinally extending, spaced apart, precut notches 25 and 26 in the blade body and a transversely extending notch 27 aligned in the direction of the gas stream over the blade body, the notches 27 being made in an airfoil top surface of the blade to be described in greater detail below.

A pair of flanged end plates for supporting the ends of the blades are provided with notches corresponding to those in the blade for achieving the mechanical interlocking assembly. One end plate 24 is illustrated in FIG. 3 and includes an end plate web 34 provided with top and bottom flanges 30 and 31 which are in turn provided, respectively, with upwardly and downwardly projecting adjoining ribs 29 and 32 at the flange extremities. Series of precut notches 28 and 32 are provided into the top and bottom flanges 31 and 32, respectively, which correspond in spacing and are arranged for receiving the end notches 26 and 25, respectively, of the blade.

To assemble the blades 23 and end panels 24 blade 23 is rotated counter-clockwise from final assembly position until top blade surface containing notch 27 will clear top flange rib 29 when notches 26 and 28 are engaged. Blade notches 26 and 27 and end plate notch 28 are proportioned such that blade end or end plate 24 may be rotated slightly when notches 26 and 28 are engaged thereby avoiding interference between blade end in the vicinity of notch 25 and end plate lower flange 31. With notches 26 and 28 engaged, blade 23 is rotated clockwise until blade notch 25 is aligned for engagement with end plate notch 33. Engagement is then completed by application of a small force which interlocks blade notch 25 and end plate notch 33 and returns blade end and end plate web 34 to parallel relationship. As clockwise rotation of blade 23 is taken to align blade notch 25 and end plate notch 33, blade top surface containing notch 27 rotates also thereby interlocking with top flange rib 29 which prevents disengagement of blades and end plate. With the attachment of blades and end plates completed as described above, the elements of the mist eliminator panel assembly are restricted and cannot disengage. Dimensional relationships between elements are fixed and the assembly can only be taken apart by an exact step by step reversal of assembly procedure described above.

Blade notch 25 is proportioned such that a small force is required to fully engage blade with end plate notch 33. Disengagement is thereby prevented unless an equal but opposite force perpendicular to end plate web 34 is applied. Such forces are virtually non-existent after panel assembly and installation of preassembled panel in the process apparatus. Additional lateral restraint against end plate rotation and disengagement of notches 25 and 33 is provided by laterally adjacent panels or structural elements of the apparatus once installation is complete. End plate design of the present invention also provides a positive blade end seal thereby eliminating voids or discontinuities in the mist eliminator section and preventing bypass and carry over of liquid that would otherwise occur.

Figure 4:
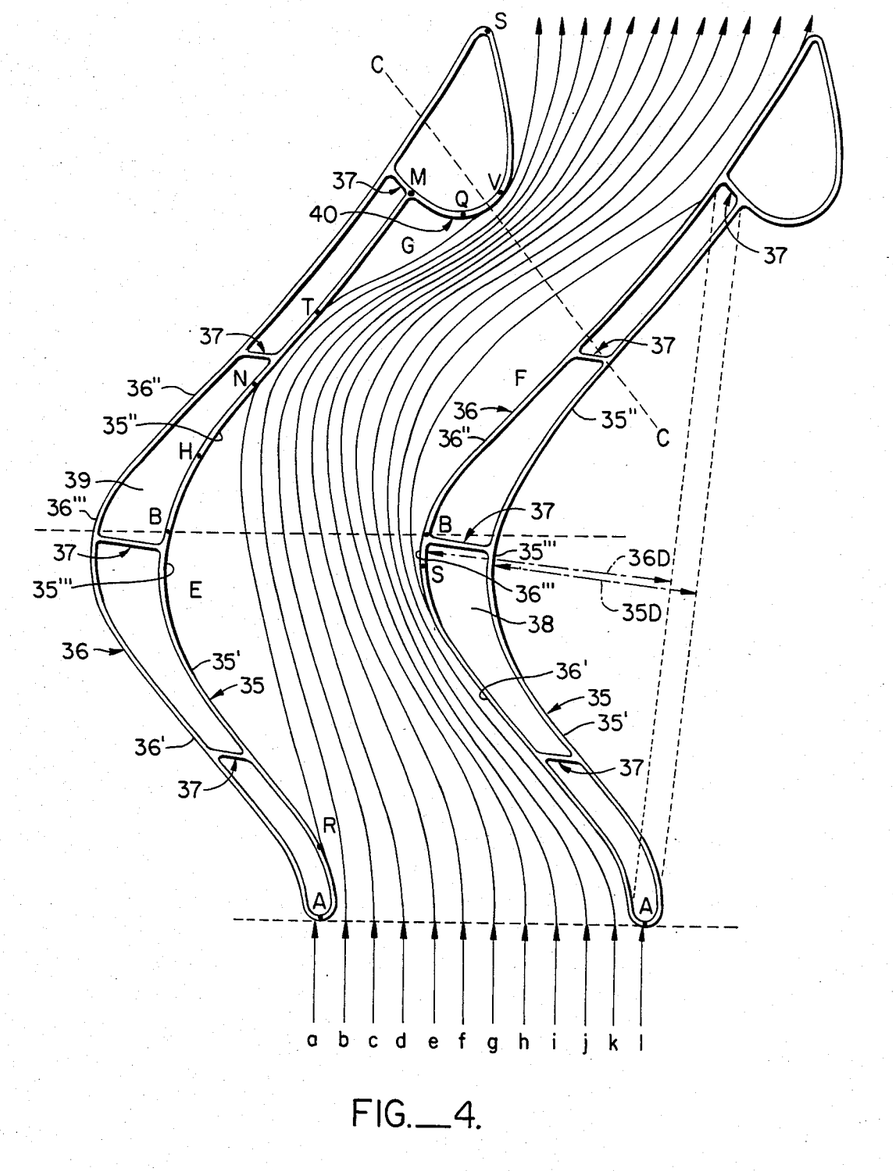
FIG. 4 is an elevational sectional view through two blades such as illustrated in FIG. 2 and taken along line 4—4 in the direction of the arrows and including streamlines illustrating the flow of the gas stream in the space between the blades.
Figure 5:
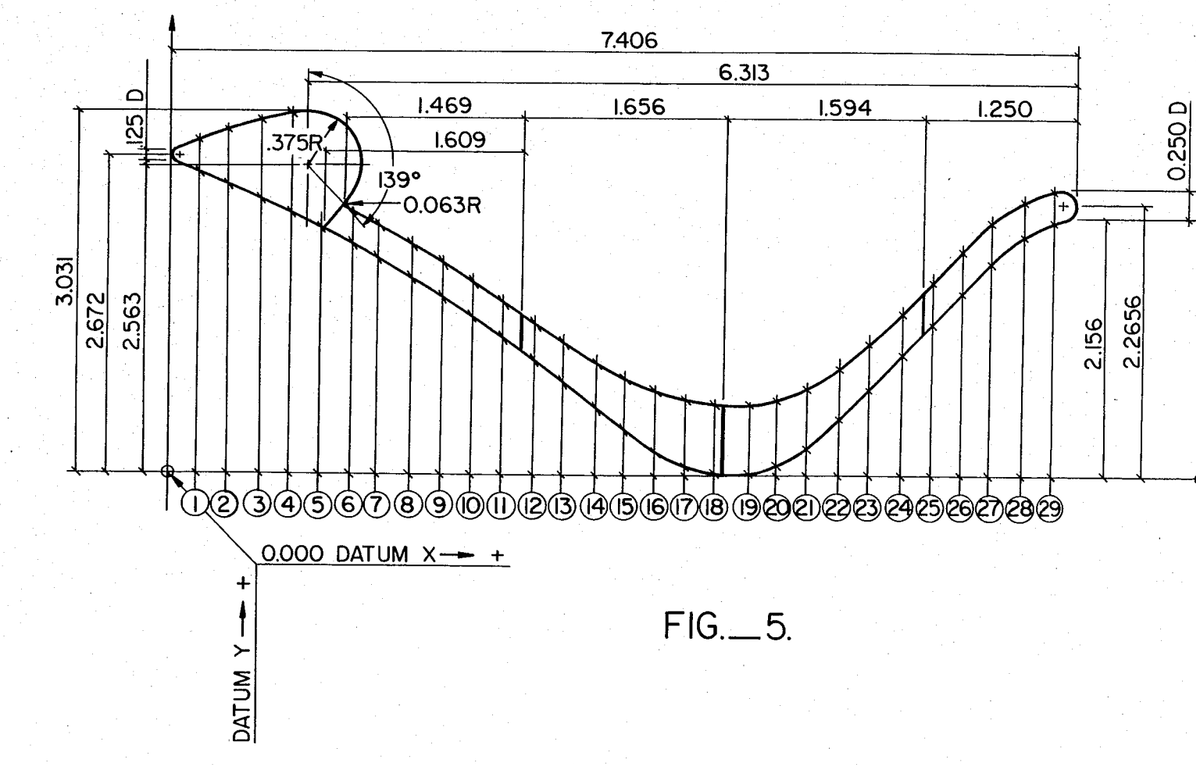
FIG. 5 is a view of one blade similar to the view in FIG. 4 showing measurement positions along the airstream length of the blade to illustrate in conjunction with Table "1" a specific design for a drift eliminator blade in accordance with the preferred embodiment of this invention.

The unique mist eliminator blade design of the present invention is best seen in FIG. 4, as well as the dimensional relationships between adjacent blades and the gas passage there between. The blades may be constructed as either a single wall or as a double wall as shown in the preferred embodiment of FIG. 4. The blade top surface 35 is connected to the bottom surface 36 by means of a plurality of webs 37 which are positioned to maintain the proper dimensional relationships between top and bottom blade surfaces while adding to the structural strength and rigidity of the blade.

As is apparent in the drawing the top surface 35 of each blade is concave being made up of an inlet inclined section 35' and an outlet inclined section of opposite slope 35" connected to the inlet section 35' by an intermediate transition section 35'''. The bottom surface 36 is convex having an inlet inclined section 36' projecting into the gas stream for turning the gas stream toward the bottom surface of the facing blade, an outlet inclined surface 36" of opposite slope and a transition region 36'''. The thickness of the blade 23 is greater between the transition regions of its convex and concave surfaces than the thickness between the inclined sections of the surfaces. As a consequence, the length of the deviation 36D of the convex surface 36 is greater than the length of deviation 35D of the concave surface as measured from corresponding portions of the inclined sections of those surfaces as illustrated for the righthand blade 23 in FIG. 4.

The outlet inclined sections of each blade are longer than the inlet inclined sections and a convex projection or airfoil 40 is provided on the top concave surface of each blade for establishing a stagnation region upstream thereof for the collection of small droplets in the gas stream.

As an aid to describing gas flow behavior, streamlines a, b, c . . . l are shown in the gas passage between blades. Gas flow between two streamlines does not cross streamline boundaries by definition, hence gas flow direction is parallel to streamlines at any point in the flow field. Areas where streamlines are closer together are areas of relatively higher gas flow velocities as dictated by flow continuity considerations. Gas enters the gas flow passage between blades at inlet plane A—A of FIG. 4 and immediately begins to turn and accelerate as gas impacts the inlet inclined section 36' of bottom blade surface 36 of the right blade 38. Gas momentum and continuity considerations also cause the gas flow to separate from the inlet inclined section 35' of the top blade surface 35 of left blade 39 in the vicinity of point R which also acts to accelerate the gas. Region E adjacent a major portion of the inlet inclined section 35', the transition region 35''' and the initial portion of outlet inclined section 35" of the concave top surface 35 of lefthand blade 39 is a turbulent wake region with no directional flow characteristics as is region F which is adjacent the transition section 36''' and the initial portion of outlet inclined section 36" of the convex bottom surface of the righhand blade 38. Gas flow continues to accelerate as it approaches plane B—B at the transition section 35''' and 36''' of the facing blade surfaces reaching a peak velocity in the vicinity of plane B—B. As gas continues to flow beyond plane B—B, flow separation again occurs in the vicinity of point S on right blade 38, and the left portion of gas flow impacts blade 39 at the outlet inclined section 35" of top surface 35 in the vicinity of point N. Gas impacting the leading edge of the airfoil section 40 defined by points M, Q, V, S on left blade top surface 35 creates a stagnation region G immediately forward of the airfoil leading edge. Impact pressure in region G causes the main body of gas flow upstream to separate from blade top surface 35 in the vicinity of point T whereupon it accelerates again reaching a peak velocity in the vicinity of plane C—C as the gas flows around the airfoil section 40. Beyond plane C—C the gas flow expands and decelerates as it approaches the exit of the gas flow passage. Those skilled in the art will recognize the flow field described above to be generally correct for the gas passage defined by the blade profile upper and lower surfaces and will recognize that specific points of flow separation, peak velocities, size of wake and stagnation regions, etc. will be determined by the physical dimensions of the blade profile and the gas flow rate. The unique nonsymetrical sinus blade shape of the present invention with extended surface B, H, N, T, M and airfoil section M, Q, V, S incorporated near the trailing edge of the blade profile results in a significant improvement in the removal of entrained droplets from the gas stream while keeping energy losses to a minimum and extending the useful gas flow operating range beyond the capabilities of known mist eliminator designs suitable for the intended purpose.

Entrained droplets of varying sizes enter the passage between blades moving in the same direction as the entering gas stream. The object of the blade design is to remove these droplets from the gas stream by causing them to impact the blade surface where they will agglomerate and can be returned to the process by means of gravity forces. The path of travel of droplets within the gas flow passage will be a function of droplet momentum and external forces acting on the droplets within the confines of the gas flow passage. The primary external forces acting on a droplet are viscous and aerodynamic forces which result from relative motion between the droplet and gas stream. These forces change rapidly both in magnitude and direction within the gas flow field and their influence on the ultimate path of travel of the droplet will depend on its momentum at the instant the force is applied. Droplet momentum at any instant is the product of its mass and velocity. The magnitude of this momentum may be considered as a measure of the droplet's ability to resist changes in the initial path of travel when external forces are applied.

Larger droplets entering the passage between blades possess relatively high initial momentum because of their large mass even though their velocity is somewhat below that of the main gas flow. Their path of travel is influenced only slightly by viscous and aerodynamic forces that occur as the main gas stream makes the initial turn and accelerates in the passage between blades. The larger droplets move in lines essentially parallel to the direction of the undisturbed gas flow entering the blade passage and impact the blade surfaces at points intersecting this line of travel. If gas velocities are high, some of the larger droplets will shatter upon impact with the blade and fragments of liquid will continue on with the gas stream as smaller droplets.

Smaller droplets enter the gas passage at velocities only slightly below that of the gas stream but have substantially lower momentum because of their much smaller mass. Their path is easily influenced by viscous and aerodynamic forces as the gas flow initially turns and accelerates between plane A—A and plane B—Bin FIG. 4. The smallest droplets take essentially the same path as the gas up to plane B—B and accelerate reaching velocities very close to that of the gas stream which substantially increases their momentum. Beyond plane B—B most of the smallest droplets have attained sufficient momentum to cause them to cross streamlines and to impact on blade 39 top surface 35 between points N, T and M. Those small droplets that escape impact are close to the blade surface and enter the stagnation area of region G outside the main gas flow stream where they impinge on the airfoil section leading edge between points M and Q. Without the extended blade surface between points B and M and the airfoil section M, Q, V, S, many of the smallest droplets would remain entrained in the gas flow and escape. Also, at lower gas flow rates some of the smaller droplets have sufficient surface tension to cause them to bounce after they impact the blade surface thereby causing them to become re-entrained in the gas stream and escape. In the present invention this is avoided since bouncing droplets enter region G and impact the airfoil leading edge.

As previously described, liquid collected on blade surfaces may be torn from these surfaces at critical points thereby becoming re-entrained in the gas stream. This is most likely to occur at points where liquid build-up on blade surfaces is greatest and concurrently where gas velocities are highest and the gas stream has a tendency to separate from the blade surface. In the present invention, the most critical area in this regard is in the vicinity of point S on blade 38. Carry over by this phenomenon is reduced in the present invention since any liquid re-entrained at point S will be directed towards collecting surface N, T, M and the airfoil leading edge by the gas stream in the vicinity of point S. The presence of the airfoil section on top blade surface 35 and the fact that flow separation points R and V occur where no water is present on the blade surface virtually eliminates the possibility of carry over by this phenomenon from top blade surfaces. Blade designs of heretofore known mist eliminators have at least one critical tear-off point on their top surface and inadequate means for limiting or recovering liquid torn from blade surfaces which limit their gas flow operating range.

While it is believed that the preferred embodiment has been described in and illustrated in sufficient detail for a person skilled in the art to practice the invention, FIG. 5 is included to provide an example of a precise mist eliminator blade in accordance with the preferred embodiment. The figure provides certain specific dimensions and specified stations along the length of the blade to provide station coordinates for the blade in accordance with the following table:

| STATION | X COORD | TOP SURFACE-Y | BOTTOM SURFACE-Y |
|---|---|---|---|
| 1 | 0.250 | 2.813 | 2.516 |
| 2 | 0.500 | 2.891 | 2.422 |
| 3 | 0.750 | 2.969 | 2.313 |
| 4 | 1.000 | 3.016 | 2.172 |
| 5 | 1.250 | on circle | 2.063 |
| 6 | 1.500 | 2.234 | 1.938 |
| 7 | 1.750 | 2.078 | 1.797 |
| 8 | 2.000 | 1.906 | 1.609 |
| 9 | 2.250 | 1.766 | 1.453 |
| 10 | 2.500 | 1.547 | 1.297 |
| 11 | 2.750 | 1.438 | 1.125 |
| 12 | 3.000 | 1.266 | 0.938 |
| 13 | 3.250 | 1.156 | 0.766 |
| 14 | 3.500 | 0.938 | 0.547 |
| 15 | 3.750 | 0.813 | 0.375 |
| 16 | 4.000 | 0.703 | 0.188 |
| 17 | 4.250 | 0.641 | 0.063 |
| 18 | 4.500 | 0.594 | 0.016 |
| 19 | 4.750 | 0.547 | 0.016 |
| 20 | 5.000 | 0.641 | 0.063 |
| 21 | 5.250 | 0.734 | 0.219 |
| 22 | 5.500 | 0.890 | 0.484 |
| 23 | 5.750 | 1.109 | 0.734 |
| 24 | 6.000 | 1.359 | 1.000 |
| 25 | 6.250 | 1.609 | 1.250 |
| 26 | 6.500 | 1.891 | 1.531 |
| 27 | 6.750 | 2.141 | 1.781 |
| 28 | 7.000 | 2.297 | 2.000 |

-continued

| STATION | X COORD | TOP SURFACE-Y | BOTTOM SURFACE-Y |
|---|---|---|---|
| 29 | 7.250 | 2.391 | 2.109 |

The blades are placed on 2¾" centers and lateral spacing between the blade centerline and position M on the blade is ¾".

As can be seen from the foregoing table and FIG. 5, the convex projecting surface, which forms the airfoil 40, has a substantially semicylindrical portion which in transverse across section subtends an arc of 139° around an axis which is located outwardly of an extension of the top concave surface 35.

It will be appreciated that additional or secondary airfoils can be added besides the one airfoil illustrated in the drawing.

While the invention has been described with reference to the illustrated counterflow cooling tower, it has already been pointed out that the mist eliminator is equally applicable to other systems, such as crossflow cooling towers. It is believed advantageous in a crossflow cooling tower to arrange the mist eliminators in accordance with the present invention at an angle to the normal horizontal path for the gas flow so that the gas stream exiting from the mist eliminator will be at least partially turned toward the fan.

While the embodiment described herein is considered as the preferred embodiment, it will be understood that various improvements and modifications may be made and it is intended to cover in the claims all such modifications and improvements as fall within the spirit and scope of the invention.

What is claimed is:

1. A mist eliminator for removing droplets of liquid entrained in a gas stream comprising:

a plurality of longitudinally extending eliminator blades positioned in side by side spaced apart relation for passing a gas stream through the space between adjacent blades from an inlet to an outlet, each blade having an inlet inclined section and an outlet inclined section, said inlet and said outlet inclined sections having opposite slope and connected by an intermediate transition section thereby establishing a convex surface on the bottom of each of said blades ad a concave surface on the top surface of each of said blades, convex surface means on said outlet inclined section of said concave surface only on the top surface of each of said blades continuous with said concave surface on the top surface of each of said blades and projecting outwardly such that a stagnation region will be provided toward the inlet from said convex surface means for impingement of water droplets in the gas stream on said convex surface means.

2. The mist eliminator of claim 1 wherein said outlet section is longer than said inlet section and said convex projecting surface means has a substantially semicylindrical portion which in transverse cross section subtends an arc of greater than 90° about an axis located outwardly of an extension of said top concave surface.

3. A mist eliminator for removing droplets of liquid entrained in a gas stream comprising:

a plurality of longitudinally extending eliminator blades positioned in side by side spaced apart relation for passing a gas stream through the space between adjacent blades from an inlet to an outlet, each blade having a top surface facing the bottom surface of an adjacent blade and a bottom surface facing a top surface of another adjacent blade;

in each adjacent pair of blades having facing bottom and top surfaces, said facing surfaces adapted for passing a gas stream therebetween, the bottom surface of each of said blades facing an adjacent top surface having a convex surface with an inclined inlet section projecting toward said adjacent top surface to a transition region where an inclined outlet section projects in the opposite direction from said bottom inclined inlet section, said inclined inlet section of each of said blades turning the gas stream toward the adjacent facing top surface and accelerating the stream and collecting liquid droplets from the gas stream along said inclined convex surface section up to said transition region;

the facing top surface of each of said blades having a concave surface with an inclined inlet section projecting away from the adjacent bottom surface to a transition region where an inclined outlet section projects in the opposite direction from said top inclined inlet section, convex surface means projecting outwardly from only said top inclined outlet section of said concave surface and continuous with said top concave surface such that a stagnation region will be provided toward the inlet from said convex surface means, said top inclined outlet section and said convex surface means of said top concave surface being positioned and arranged so at to turn the gas stream toward the facing bottom surface and accelerating the stream and collecting droplets along said inclined concave outlet surface section downstream of said transition region and toward the inlet from said convex surface means, said projecting convex surface means having a substantially semicylindrical portion which in transverse cross section subtends an arc greater than 90° about an axis located outwardly of an extension of said top concave surface.

4. A mist eliminator for removing droplets of liquid entrained in a gas stream comprising:

a plurality of longitudinally extending eliminator blades positioned in side by side spaced apart relation for passing a gas stream through the space between adjacent blades from an inlet to an outlet, each blade having an inlet inclined section and an outlet inclined section, said inlet and said outlet inclined sections having opposite slope and connected by an intermediate transition section thereby establishing a convex surface on the bottom of said blade and a concave surface on the top surface of said blade, means forming a convex surface only on said outlet inclined section of said concave surface on the top surface of said blade projecting into the gas stream for establishing a stagnation region upstream of said convex surface means, said convex projecting surface means including an airfoil section, a pair of end plates supporting the opposite ends of said blades, each of said end plates having a pair of spaced apart flanges with at least one of said flanges having an adjoining rib longitudinally thereof projecting therefrom in a direction away from said other flange, each of said flanges of said pair of plates having a notched out portion receiving a portion of each of said blades, each of said blades having notched out portions longitudinally thereof at each end thereof engaging a corresponding flange notched out portion, and said airfoil section at each end of each of said blades having a notched out portion transversely thereof engaging said projecting rib whereby each end of said blade is mechanically interlocked with one of said plates.

5. A mist eliminator for removing droplets of liquid entrained in a gas stream comprising:

a plurality of longitudinally extending eliminator blades positioned in side by side spaced apart relation for passing a gas stream through the space between adjacent blades from as inlet to an outlet, each blade having an inlet inclined section and an outlet inclined section, said inlet and said outlet inclined section having opposite slope and connected by an intermediate transition section thereby establishing a convex surface on the bottom of said blade and a concave surface on the top surface of said blade, means forming a convex surface only on said outlet inclined section of said concave surface on the top surface of said blade projecting into the gas stream for establishing a stagnation region upstream of said convex surface means, a pair of end plates supporting the opposite ends of said blades, each of said end plates having a pair of spaced apart flanges with at least one of said flanges having an adjoining rib longitudinally thereof projecting perpendicular to said one flange, each of said flanges of said pair of plates having a notched out portion receiving a portion of each of said blades, each of said blades having notched out portions extending longitudinally thereof at each end thereof engaging a corresponding flange notched out portion, each of said blades having a notched out portion extending transversely thereof at each end thereof engaging said projecting rib whereby each end of each blade is mechanically interlocked with one of said end plates.

* * * * *